L. A. SUBERS.
HOSE CONSTRUCTED OF LAMINATED COHESIVE INTERWOUND MEMBERS WITH VARIABLY EXPANSIBLE ZONES.
APPLICATION FILED OCT. 17, 1910.
1,010,088.
Patented Nov. 28, 1911.
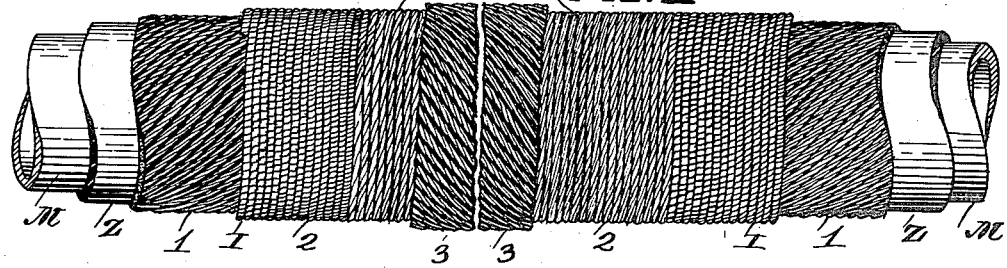
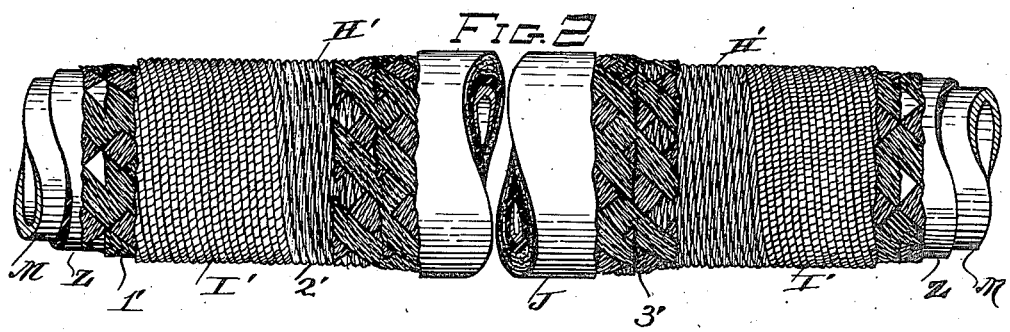
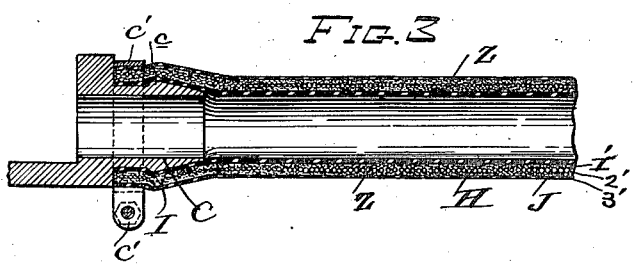
Witnesses:
Ernest Mosman
S. L. Eshine
Inventor.
Lawrence A. Subers
by Wm. M. Monroe
Attorney

UNITED STATES PATENT OFFICE.

LAWRENCE A. SUBERS, OF CLEVELAND, OHIO.

HOSE CONSTRUCTED OF LAMINATED COHESIVE INTERWOUND MEMBERS WITH VARIABLY-EXPANSIBLE ZONES.

1,010,088. Specification of Letters Patent. Patented Nov. 28, 1911.

Original application filed January 31, 1910, Serial No. 540,982. Divided and this application filed October 17, 1910. Serial No. 587,633.

*To all whom it may concern:*

Be it known that I, LAWRENCE A. SUBERS, a citizen of the United States, and resident of Cleveland, in the county of Cuyahoga and State of Ohio, have invented certain new and useful Improvements in Hose Constructed of Laminated Cohesive Interwound Members with Variably-Expansible Zones, of which I hereby declare the following to be a full, clear, and exact description, such as will enable others skilled in the art to which it appertains to make and use the same.

This invention is a division of my application Ser. No. 540,982 filed January 31, 1910.

The objects of the invention are to provide means for permitting certain portions of a hose such as the ends which are sleeved over or may be expanded in a coupling to expand more readily than other portions such as the body portions, without lessening their strength in the more expansible portions.

It will be readily understood that the amount of expansion that can be permitted in the body portions of air brake hose, or in tubing for any purpose adapted to sustain very high internal pressure should be very slight as also the amount of elongation of the hose under high pressure, and the ratio of expansion to elongation or contraction controls the capability of the hose to sustain great internal pressure. In a hose of this character the body portion of the fabric is substantially non-expansible and the hence fluid tight couplings which depend upon the expansion of the hose for their insertion therein are extremely difficult of attachment. For this reason some means permitting the extremities of the tubing to be sufficiently expanded to permit the attachment of the couplings without affecting the rigidity of the body portions has long been recognized as a necessity in the art. To accomplish this result and to make the ratio of expansibility at any part or any in layer of hose controllable at the will of the maker, the cords themselves which form the component portions of the fabric are made extensible and the amount of capability of stretching of predetermined parts of the cord is definitely controlled therein. This is accomplished by giving a greater number of twists per inch to those portions of the cords which form extremities of the hose into which the couplings are to be inserted than in the body portions. The body portions would therefore have a relatively less number of twists per inch. The result of this construction is to make the extremities relatively more expansible than the body portions, so that the couplings can be forced into them or expanded therein and they will thereby become sufficiently elastic to enable them to assume the shape of the couplings, so that the hose can be clamped securely upon the couplings to prevent leakage under pressure.

The invention is illustrated in the accompanying drawings, hereinafter further described, and specifically pointed out in the claims.

In the accompanying drawings Figure 1 is a side elevation of a hose showing three layers, the middle layer of which is composed of twisted cords or threads circumferentially or transversely wound in close spirals. The cord in this spirally wound layer is so twisted as to be as rigid and inexpansible as possible or to a predetermined amount in the body of the hose, and at the ends of the hose the cord is twisted so as to be capable of stretching a greater amount than in the body portion. The inner and outer layers are wound at an angle of approximately 45° and 135° respectively, relatively to any longitudinal surface line on that layer, and cross each other at approximately right angles; Fig. 2 is a similar view of a hose in which a similar circumferentially or spirally wound layer of twisted cord is wound upon a layer of laminated-cohesive-interwound bands of cords crossing each other at angles of approximately 45° and 135° respectively, and an outer layer of laminated-cohesive-interwound bands of twisted cords similar to the first layer and crossing each other at angles of approximately 45° and 135° respectively is formed upon the spirally wound layer; Fig. 3 is a longitudinal section of a portion of hose, showing also one part of a coupling inserted in the more expansible end and so constructed that the diameters of the openings in the coupling and hose remain equal; Fig. 4 is a portion of twisted cord similar to that used in making a layer of spirally wound cord or employed in constructing the bands of twisted cord, a predetermined length of this cord is provided with a predetermined number of twists per inch, and is adapted to form the body portion of the layer, and at each extremity a predetermined length of the cord is provided with a calculated greater number of twists per inch, and these extremities form the extremities of the layer.

In Fig. 1 is shown the mandrel M on which is first placed the rubber lining Z forming the inner surface of the hose; upon this lining is wound at an angle of 45° or other predetermined angle to any longitudinal surface line on that layer, layer 1 composed of fibrous twisted cords or threads, upon this is wound the layer 2 composed of circumferentially or spirally wound twisted cords or threads, and upon this is wound a layer of fibrous twisted cords or threads 3, at an angle the reverse of the angle of laying the cords in the layer 1, or at an angle of approximately 135°. In this figure the modifications in the twist in the cords of the layer 2 are most clearly shown.

The body of the layer at H is composed of a zone of cords having a less number of twists per inch than the cords in the zones I, I which form the extremities. For instance, the ratio of twists may be six twists per inch in the cords in the outer extremities, and as low as $1\tfrac{6}{10}$ per inch in the body portion. The circumferential layer 2 is obviously the most rigid of all the layers to resist diametric pressure and hence the variation in the number of twists per inch in the cords of the central and terminal zones is the greatest in this layer.

In constructing the hose each cord is twisted while being made so as to have a portion or zone L forming the body of the cord and to be incorporated in the body portion H of the layer in which the number of twists per inch is small, and also portions or zones L' at the extremities in which the number of twists per inch is large, which are incorporated in the zones forming the outer extremities of the layer as shown in Fig. 4. The layers 1 and 3 are designed to resist longitudinal tension and hence may be more expansible than the layer 2 owing to their angular direction in the hose and hence may or may not be provided with zones in which the number of twists per inch in the cord varies. Where such variations occur the layers 1 and 3 may be provided with zones at their outer extremities in which the zones are formed of cords having three twists per inch, and the central portions may have $1\tfrac{6}{10}$ twists per inch. The amount of twist can be varied at pleasure in any one zone or portion of the hose, or incorporated into any predetermined portion thereof.

In Fig. 2 the construction is similar and the zone portions are designated by similar letters. Here the layers 1' and 3' are shown to be formed of interwound, cohesive, equally spaced fibrous members, made in two plies which are laminated in construction as described in my said application Ser. No. 540,982. These layers are designed to permit the required flexibility and also to resist longitudinal tension or strain, and the circumferentially or spirally wound layer 2' intermediate between the other layers is designed to resist diametrical pressure. The zones are shown at 1' and I'. A rubber cover is shown at J.

In Fig. 3 the outer end of the hose is shown to be expanded by means of the insertion of the tapered coupling C which is provided with a shoulder $c$ over which the expansible portion of the hose is stretched and a clamp $c'$ exerts a pressure to secure the extremity of the hose behind the said shoulder. This mode of construction enables the manufacturer to construct hose or other tubing capable of sustaining a very high degree of internal pressure without a detrimental amount of expansion or limit of elasticity in the main portion, but which will be capable of a sufficient amount of expansion at its ends to permit of stretching it to enable the couplings to be inserted therein, or for expansion rings to be expanded therein if a coupling requiring them be used. The cords are made cohesive by means of a coating thereon of rubber or similar material preferably vulcanizable, which may be put on them in any convenient manner.

Having described the invention, what I claim as new and desire to secure by Letters Patent is:

1. In a hose, a layer composed of adhering twisted cords, said cords provided with zones of predetermined limits of elasticity differing from the limits of elasticity of the main portions of said cords, the portions of said cords having a common limit of elasticity being placed in close juxtaposition whereby zones of similar predetermined limits of elasticity are formed in said layer.

2. In a hose, parallel adhering twisted cords, the said cords provided with zones, the said zones having each a predetermined limit of elasticity.

3. In a hose, a series of twisted cords, each cord provided with zones in which the number of twists per inch varies from the number of twists per inch in other portions thereof, whereby varying zones of elasticity are formed in the completed cord and in the completed hose constructed therefrom.

4. In a hose, a layer formed of adhering cords, said cords having a greater number of twists per inch in portions recurring at predetermined intervals, than in the portions intermediate therewith.

5. In a hose, a layer composed of spirally wound cord, the portions of cord in zones at the extremities thereof having a higher ratio of elasticity than the intermediate portion.

6. In a hose, a layer composed of transversely wound cord, the extremities of said cord having a greater number of twists per inch than the number of twists per inch in the body of the hose, whereby zones are formed in said layer, in the body and extremities, the extremities being capable of greater expansion than the body portion.

7. In a hose, a rubber lining, a layer of rubbered twisted cords wound thereon at a wide angle, a layer of spirally wound twisted cords and a layer of twisted cords wound at right angles to said first layer, and a binding of vulcanizable material for said cords and layers, the cords at the extremities of said layers having a greater number of twists per inch than the cords of the intermediate portions thereof.

In testimony whereof, I hereunto set my hand this 14th day of October 1910.

LAWRENCE A. SUBERS.

In presence of—
ERNEST MOSMAN,
S. L. EXLINE.